United States Patent [19]

Pafford

[11] Patent Number: 4,824,204

[45] Date of Patent: Apr. 25, 1989

[54] FIBER OPTIC CONNECTOR THAT JOINS MULTIPLE, BUT AT LEAST ONE, FIBER OPTIC CABLES TO A DUAL DIAMETERED FIBER OPTIC CABLE AND A MULTIPLE POSITION CLAMP TO JUXTAPOSE A PLURALITY OF THE SAID FIBER OPTIC CONNECTER

[76] Inventor: Thomas L. Pafford, 12404 Harbor Dr., Woodbridge, Va. 22192

[21] Appl. No.: 868,539

[22] Filed: May 30, 1986

[51] Int. Cl.⁴ ............................................. G12B 6/38
[52] U.S. Cl. ............................. 350/96.21; 350/96.22; 350/96.15
[58] Field of Search ............... 350/96.15, 96.16, 96.20, 350/96.21, 96.22

[56] References Cited

U.S. PATENT DOCUMENTS

| | | | |
|---|---|---|---|
| 3,990,779 | 11/1976 | McCartney | 350/96.21 |
| 4,130,345 | 12/1978 | Doellner | 350/96.22 |
| 4,193,661 | 3/1980 | d'Auria et al. | 350/96.16 |
| 4,423,923 | 1/1984 | Frazier et al. | 350/96.15 |
| 4,432,603 | 2/1984 | Morency et al. | 350/96.21 |
| 4,433,896 | 2/1984 | Frazier | 350/96.21 |
| 4,435,038 | 3/1984 | Soes et al. | 350/96.21 |
| 4,465,335 | 8/1984 | Eppes | 350/96.21 |
| 4,611,885 | 9/1986 | Boirat | 350/96.20 |

FOREIGN PATENT DOCUMENTS 2504819  8/1976  Fed. Rep. of Germany ... 350/96.21

OTHER PUBLICATIONS

Balliet et al., IBM Technical Disclosure Bulletin, vol. 24, No. 12, May 1982, "Single Element Fiber-Optic to Fiber-Optic Coupler", pp. 6331-6332.

Primary Examiner—William L. Sikes
Assistant Examiner—Frank González
Attorney, Agent, or Firm—Kerkam, Stowell, Kondracki & Clarke

[57] ABSTRACT

Disclosed is a fiber optic connector capable of joining at least one fiber optic cable to a dual diametered fiber optic cable, in which light loss caused by axial offset is eliminated and light loss caused by either angularity offset or gaps between the fiber end faces is reduced. Also disclosed in a multiposition clamp capable of juxtaposing a plurality of fiber optic connectors.

3 Claims, 4 Drawing Sheets

2

FIBER OPTIC CONNECTOR THAT JOINS MULTIPLE, BUT AT LEAST ONE, FIBER OPTIC CABLES TO A DUAL DIAMETERED FIBER OPTIC CABLE AND A MULTIPLE POSITION CLAMP TO JUXTAPOSE A PLURALITY OF THE SAID FIBER OPTIC CONNECTER

FIELD OF THE INVENTION

The present invention relates generally to fiber optic connectors and, more particularly, to a fiber optic connector capable of joining at least one fiber optic cable to a dual diametered fiber optic cable. The present invention further relates to a multiposition clamp capable of juxtaposing a plurality of fiber optic connectors.

BRIEF SUMMARY OF THE INVENTION

As fiber optic technology advances towards more and more practical applications, the need continues for hardware that is simple, economical, and more efficient in reducing or eliminating light loss problems. Fiber optic technology associated with light loss problems include axial offset, the meeting end faces of fibers that overlap; angularity offset, meeting end faces of fibers that do not meet in a vertical plane; or gaps that exist between meeting end faces of fibers, or a combination of the above.

It is an object of the present invention to provide a fiber optic cable where in each of the ends of the fiber optic cable have of different diameters. This cable with differing diametered ends is referred to as a dual diametered fiber optic cable. The face end of the fiber optic cable with the larger diameter is referred to as the large end of the dual diametered fiber optic cable.

It is another object of the invention to provide a fiber optic connector that joins at least one fiber optic cable to a dual diametered fiber optic cable.

It is still another object of the invention to provide a fiber optic connector wherein the light loss caused by axial offset between the end faces of meeting fibers is eliminated.

It is a further object of the invention to provide a fiber optic connector wherein the light loss caused by angularity offset between the end faces of meeting fibers is reduced.

It is a still further object of the invention to provide a fiber optic connector wherein the light loss caused by gaps between the end faces of meeting fibers is reduced.

It is a still further object of the invention to provide a multiposition clamp capable of joining a plurality of fiber optic connectors.

The present invention relates to a fiber optic connector that contains a dual diametered fiber optic cable, the large end of which is joined to at least one other fiber optic cable. The fiber optic connector consists of two sections: a male section and a female section. The large end of the dual diametered fiber optic cable is centered in the female section. The fiber optic cable or cables to be joined with the large end of the dual diametered fiber optic cable are centered in the male section.

Light loss in any fiber optic connector can be caused by: (1) axial offset between end faces of meeting fibers, (2) angularity offset between the end faces of meeting fibers, and (3) gaps between the end faces of meeting fibers. The fiber optic connector of the present invention eliminates light loss caused by axial offset and reduces light loss caused by angularity offset and gaps. The male section permits the fiber optic cables centered within it to be positioned on the large end of the dual diametered fiber optic cable. Axial offset is eliminated since the combined diameters of the fiber optic cable or cables are smaller than the diameter of the large end of the dual diametered fiber optic cable. The part of the male section that enters the female section is referred to as the front end of the male section. The surface of the front end of the male section, but not the ends of the fiber optic cables within it, is covered with a suitable reflective material or compound, such as a silver layer. The reflective layer reduces light loss caused by angularity offset between the end faces of meeting fibers and gaps between the end faces of meeting fibers by returning the light reflected from the surface of the large end of the dual diametered fiber optic cable back to the large end of the dual diametered fiber optic cable.

The present invention is directed to a multiposition clamp that is capable of juxtaposing a plurality of the fiber optic connectors. A simple and economical multiple position fiber optic connector may be produced by juxtaposing a plurality of fiber optic connectors.

DETAILED DESCRIPTION OF THE INVENTION

Figure 1:
FIG. 1 is a perspective view of a dual diametered fiber optic cable with each of its two ends having different diameters. The figure displays, particularly, the large end of the dual diametered fiber optic cable.
Figure 2:
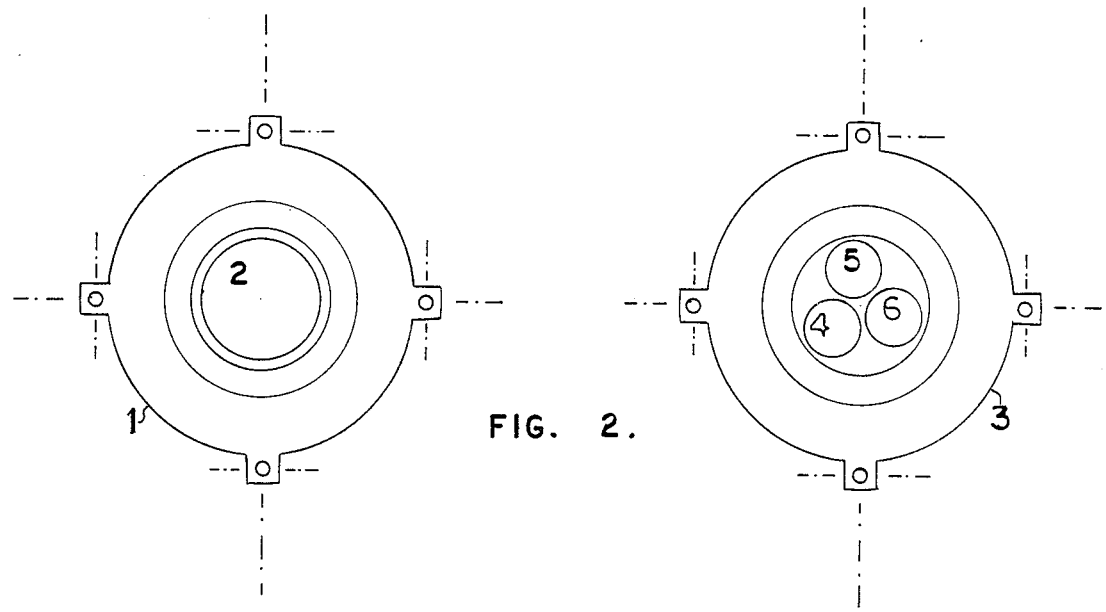
FIG. 2 is a front view of the male and female sections. The end surface of the large end of the dual diametered fiber optic cable can be seen in the female section. The end surface of the fiber optic cables centered in the male section can also be seen. The combined diameters of the fiber optic cables is smaller than the diameter of the end surface of the large end of the dual diametered fiber optic cable.
Figure 2A:
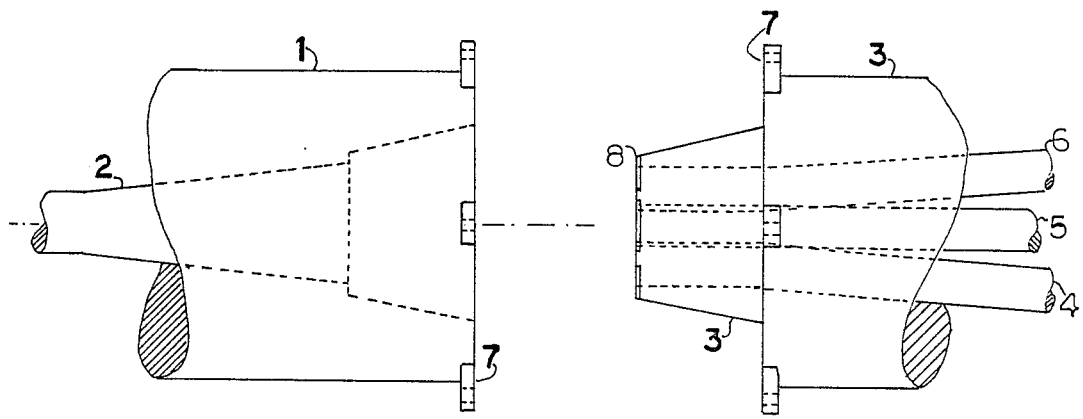
FIG. 2a is a side view of the male and female sections shown in FIG. 2.
Figure 3:
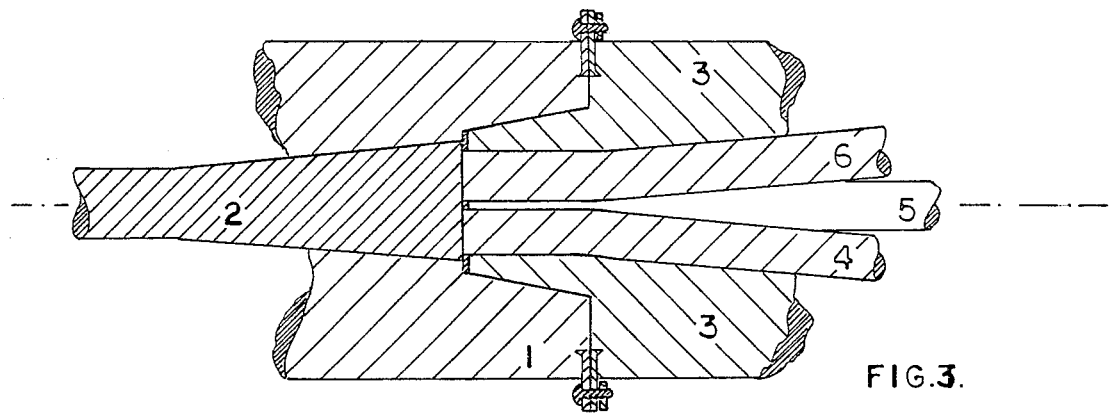
FIG. 3 is a section view of the fiber optic connector showing the fiber optic cables joined to the large end of the dual diametered fiber optic cable.
Figure 4:
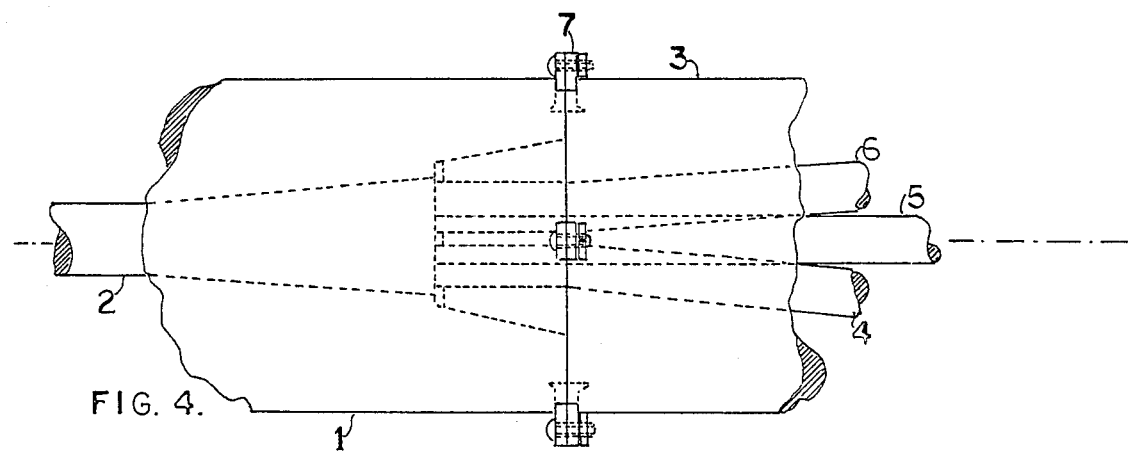
FIG. 4 is an elevation view of the fiber optic connector showing the fiber optic cables joined to the staed large end of the dual diametered fiber optic cable.

The fiber optic connector of the present invention consists of: (1) a male section, (2) a female section, (3) a dual diametered fiber optic cable, (4) at least one, fiber optic cable, (5) a reflective layer, and a (6) tapering front end section of the male section FIG. 1 is a view of the dual diametered fiber optic cable 2 illustrating the different diameters of the ends of the cable 2. The face end of the cable 2 with the large diameter is referred to as the large end of the dual diametered fiber optic cable. The large end of the dual diametered fiber optic cable 2 is centered in th female section 1, as shown in FIG. 2. In the same figure is also shown the fiber optic cables 4, 5, & 6 centered in the male section 3. The female section 1 and the male section 3 are made of plastic or other suitable material or compound. The front end of the male section 3, shown in FIG. 2a, is tapered and is coated with a reflective layer 8 such as silver, or other suitable material or compound. FIG. 2a also shows that the female section 1 is indented to receive the front end of the male section 3. FIG. 3 shows the mated male and female sections. The male and female section are held together by a screw and nut 7, shown in FIG. 4.

Figure 5:
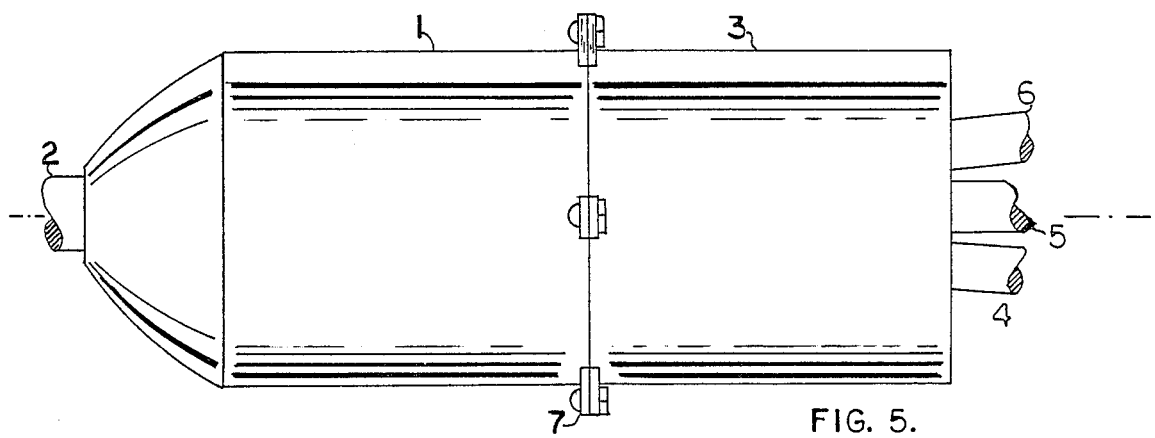
FIG. 5 is a side view of the fiber optic connector showing fiber optic cables joined to the dual diametered fiber optic cable.
Figure 6:
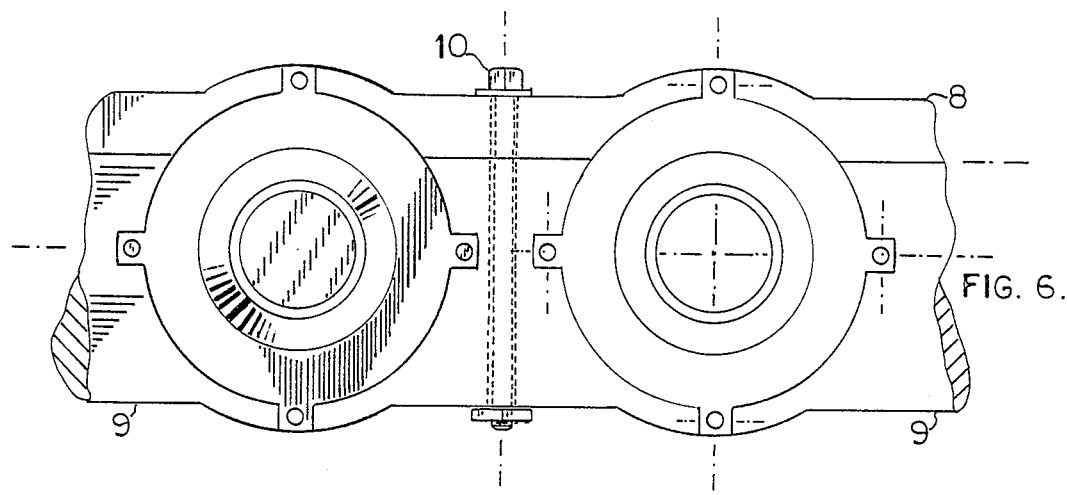
FIG. 6 is a front view of the multiposition clamp holding two of the female sections.
Figure 7:
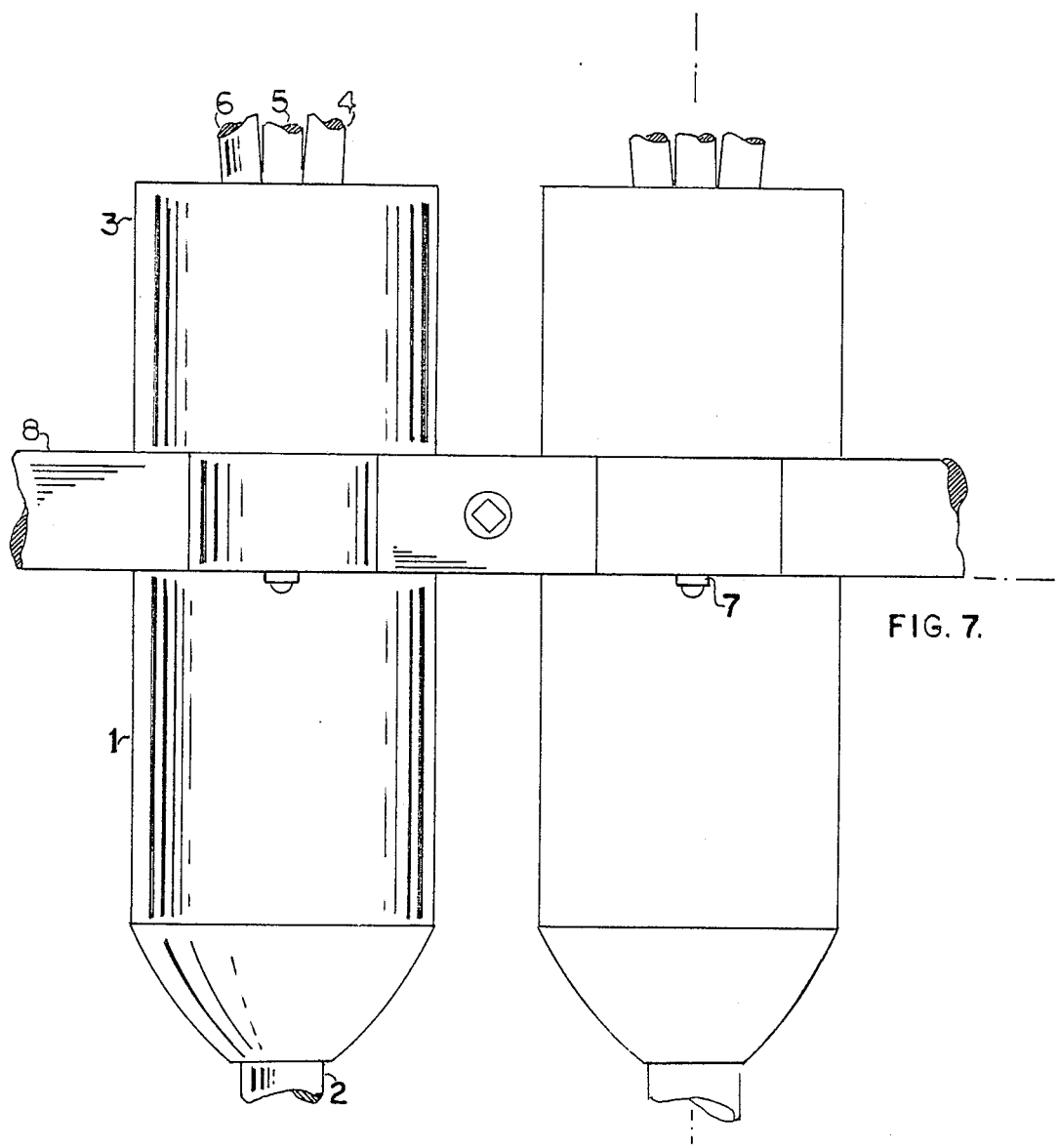
FIG. 7 is a top view of the multiposition clamp holding two of the fiber optic connectors.
Figure 8:
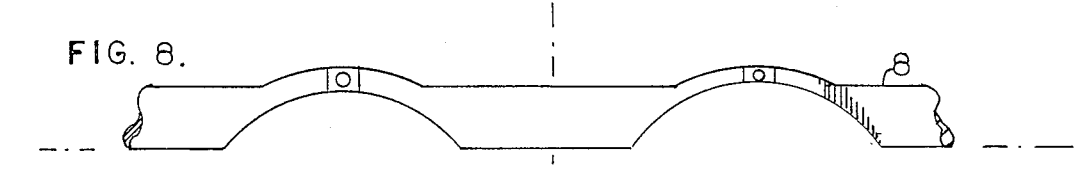
FIG. 8 is a sectional view of the top section of the multiposition clamp.
Figure 9:
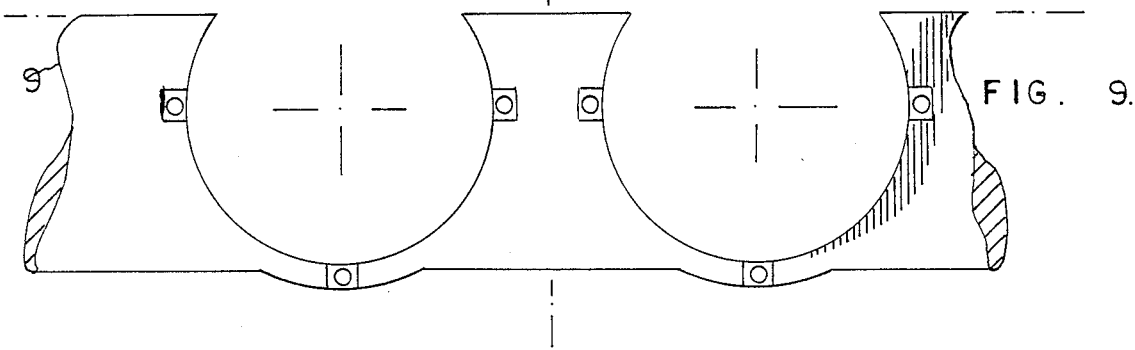
FIG. 9 is a section view of the bottom section of the multiposition clamp.
Figure 10:
FIG. 10 is an elevation view of the top section of the multiposition clamp.
Figure 11:
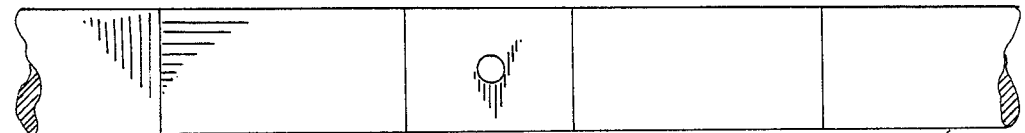
FIG. 11 is an elevation view of the bottom section of the multiposition clamp.

FIG. 5 shows a elevated view of the fiber optic connector of the present invention illustrating how screw 7 holds the female section and the male section 3 together. The multiposition clamp shown in FIG. 6 is held together by a bolt and nut 10, and is shown juxtaposing two female sections. The multiposition clamps is comprised of two sections: a top section 8 and a bottom section 9. Both are made of plastic or other suitable material or compound. The multiposition clamp is fastened to two of the fiber optic connectors in FIG. 7 by screw 7. FIGS. 8 and 9 respectively show the top section of the multiposition clamp 8, and the bottom section of the multiposition clamp 9. FIGS. 10 & 11 show the multiposition clamp, the top section 8, and the bottom section 9, from an elevated view.

While the invention has been particularly shown and described, persons knowledgeable in the art will recognize that the above and other changes in form and detail may be made therein without departing from the spirit and scope of the invention.

I claim:

1. A fiber optic connector comprising at least one fiber optic cable joined to a dual diametered fiber optic cable, said fiber optic connector including a male member containing said at least one optic cable and a female member containing said dual diametered fiber optic cable an end of said male member being coated with a reflective material and said at least one fiber optic cable being free of reflective material.

2. The fiber optic connector according to claim 1 wherein said male member further comprises means to align said at least one fiber optic cable whereby loss of light being propagated through said connector due to angularity offset and to axial offset is minimized.

3. The fiber optic connector according to claim 1 wherein said dual diameter fiber comprises a core, said core having an end section within said female member, said end section having at least one portion which is in the shape of a parabola.

* * * * *